(12) United States Patent
Filev et al.

(10) Patent No.: US 9,535,653 B2
(45) Date of Patent: Jan. 3, 2017

(54) ADJUSTING AUDIO VOLUME OF MULTIMEDIA WHEN SWITCHING BETWEEN MULTIPLE MULTIMEDIA CONTENT

(75) Inventors: Momchil Filev, Mountain View, CA (US); Martin B. Freund, Mountain View, CA (US)

(73) Assignee: Google Inc., Mountain View, CA (US)

( * ) Notice: Subject to any disclaimer, the term of this patent is extended or adjusted under 35 U.S.C. 154(b) by 210 days.

(21) Appl. No.: 13/600,825

(22) Filed: Aug. 31, 2012

(65) Prior Publication Data

US 2014/0068434 A1    Mar. 6, 2014

(51) Int. Cl.
| | |
|---|---|
| G06F 3/048 | (2013.01) |
| G06F 17/30 | (2006.01) |
| G06F 15/16 | (2006.01) |
| G06F 3/16 | (2006.01) |
| G06F 3/0484 | (2013.01) |

(52) U.S. Cl.
CPC ............ G06F 3/165 (2013.01); G06F 3/0484 (2013.01)

(58) Field of Classification Search
CPC ............ G06F 3/00; G06F 3/167; G06F 3/048; G06F 6/00; G06F 17/30; G06F 15/16
USPC ........................................................ 715/716
See application file for complete search history.

(56) References Cited

U.S. PATENT DOCUMENTS

| | | | |
|---|---|---|---|
| 5,682,166 A * | 10/1997 | Takahashi | G06F 3/16 340/4.13 |
| 8,136,040 B2 * | 3/2012 | Fleming | 715/716 |
| 8,250,228 B1 * | 8/2012 | Johansson | 709/231 |
| 8,280,541 B1 | 10/2012 | Chen | |
| 2005/0053052 A1 * | 3/2005 | Ree et al. | 370/352 |
| 2006/0161859 A1 * | 7/2006 | Holecek et al. | 715/781 |
| 2006/0168540 A1 * | 7/2006 | Cejka | G06F 17/30896 715/786 |
| 2008/0276248 A1 | 11/2008 | Xu et al. | |
| 2008/0288876 A1 * | 11/2008 | Fleming | G06F 3/167 715/761 |
| 2009/0080860 A1 * | 3/2009 | Nakano | H04N 5/44508 386/241 |
| 2009/0319898 A1 * | 12/2009 | Vitorino | H04M 1/2535 715/716 |
| 2010/0017696 A1 * | 1/2010 | Choudhary | G06F 17/30902 715/205 |
| 2011/0035703 A1 | 2/2011 | Negishi et al. | |
| 2011/0078652 A1 * | 3/2011 | Mani | G06F 8/10 717/105 |
| 2011/0082755 A1 * | 4/2011 | Itzhak | G06Q 30/02 705/14.69 |

(Continued)

OTHER PUBLICATIONS

Page Visibility API, Jul. 3, 2011, MS Microsoft.*

(Continued)

Primary Examiner — Jennifer To
Assistant Examiner — Hugo Molina
(74) Attorney, Agent, or Firm — Lowenstein Sandler LLP

(57) ABSTRACT

A multiple media module receives data indicating a status of a tab of a graphical user interface (GUI) presented on a user device. The multiple media module determines, based on the data indicating the status of the tab, whether the tab is active, the tab comprising a streaming media player. If the tab of the web browser is not active, the multiple media module mutes an audio component of a streaming media file playing in the streaming media player.

12 Claims, 8 Drawing Sheets

(56) References Cited

U.S. PATENT DOCUMENTS

| | | |
|---|---|---|
| 2011/0088039 A1 | 4/2011 | Tabone et al. |
| 2011/0113337 A1 | 5/2011 | Liu et al. |
| 2011/0145708 A1* | 6/2011 | Bhogal ............... H04L 65/4092 715/716 |
| 2011/0161006 A1* | 6/2011 | Deurwaarder ......... G01C 21/26 701/408 |
| 2011/0191677 A1* | 8/2011 | Morris ...................... G06F 3/00 715/716 |
| 2011/0202843 A1* | 8/2011 | Morris ................... G06F 3/013 715/716 |
| 2012/0022926 A1* | 1/2012 | Ramanathan ......... G06F 3/0485 705/14.4 |
| 2012/0166991 A1* | 6/2012 | Cramer et al. ................ 715/771 |
| 2012/0179098 A1* | 7/2012 | Poveda Estepa ... A61M 5/3234 604/110 |
| 2012/0291053 A1 | 11/2012 | Carter et al. |
| 2013/0080930 A1* | 3/2013 | Johansson ..................... 715/760 |
| 2014/0052438 A1* | 2/2014 | Yerrace et al. ............... 704/201 |
| 2014/0078402 A1* | 3/2014 | Weast .......................... 348/730 |
| 2014/0254489 A1* | 9/2014 | Han et al. ..................... 370/328 |

OTHER PUBLICATIONS

International Search Report for and Written Opinion of the International Searching Authority for International Patent Application No. PCT/US 13/57717 mailed Mar. 25, 2014.

Sam Dutton: "Automatically pause video when it's not visible; Sam Dutton's blog", Aug. 5, 2011 (Aug. 5, 2011), pp. 1-2, XP055266568, Retrievd from the Internet: URL:https://samdutton.wordpress.com/2011/08/05/extension-to-pause-video-when-its-not-visible/ [retrieved on Apr. 19, 2016].

W3C: "Page Visibility (W3C Working Draft Jun. 2, 2011)", Internet Citation, Jun. 2, 2011 (Jun. 2, 2011), pp. 1-4, XP002678630, Retrieved from the Internet: URL:http://www.w3.org/TR/2011WD-page-visibility-20110602/ [retrieved on Jun. 26, 2012].

European Search Report for European Patent Application No. 13833280.4, mailed May 2, 2016, 9 pages.

* cited by examiner

ADJUSTING AUDIO VOLUME OF MULTIMEDIA WHEN SWITCHING BETWEEN MULTIPLE MULTIMEDIA CONTENT

TECHNICAL FIELD

This disclosure relates to the field of multimedia content and, in particular, to adjusting audio volume of multimedia when switching between multiple multimedia content.

BACKGROUND

Streaming media is multimedia, such as video and audio content, which is received by and presented to an end-user while being delivered by a streaming provider. With streaming media, a client media player can start playing media content before the entire file has been transmitted from a server, e.g., over a telecommunications network. For example, a user may visit a media streaming website using a web browser running on a personal computing device. The user may play multimedia content, including video and audio portions, in a media player from the media streaming website. The streaming provider may transmit the audio and video portions of the content to the personal computing device over a network, such as the Internet, which may be played back in the media player.

Many users stream multimedia content, including video and audio components, to their personal computers. In some cases, a user may stream multiple multimedia content items, so that the streams run simultaneously in multiple windows or tabs of a browser. For example, this may occur when streaming different sporting events or other types of multiple coverage for an event that the user wants to toggle between. In these cases, the user typically hears the sound from the multiple multimedia streams playing in the different windows or tabs of the browser, regardless of which multimedia stream the user is currently watching. This is a sub-optimal experience for the user, as the conflicting sounds from the various multimedia streams cancel each other out. Solutions exist that turn off sound using shortcuts on a taskbar of the user's device or using keyboard controls. However, these solutions usually require the user to manually select the task bar shortcut or manually input the keyboard control.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a multiple media module receives data indicating a status of a tab of a graphical user interface (GUI) presented on a user device. The multiple media module determines, based on the data indicating the status of the tab, whether the tab is active, the tab comprising a streaming media player. If the tab of the web browser is not active, the multiple media module mutes an audio component of a streaming media file playing in the streaming media player. In some implementations, the tab is not active if the tab is in the background of the GUI, behind one or more other tabs.

The multiple media module may also stop playback of the audio component of the streaming media file to the user device and continue to transmit a video component of the streaming media file to the user device. In one implementation, if the tab of web browser is active, the multiple media module determines if a volume level of the audio component is currently muted. If the volume level of the audio component is currently muted, increasing the volume level to a default setting. On the other hand, if the volume level of the audio component is not currently muted, maintaining a current setting of the volume level of the audio component.

In further implementations, the multiple media module also, subsequent to receiving the data indicating the status, determines that other streaming media files are playing in other streaming media players in other tabs of the GUI. In addition, receiving the data indicating the status of the tab can include sending a request for the status of the tab using a page visibility application programming interface of the GUI.

In additional implementations, computing devices for performing the operations of the above described embodiments are also implemented. Additionally, in implementations of the disclosure, a computer readable storage media stores methods for performing the operations of the above described embodiments.

BRIEF DESCRIPTION OF THE DRAWINGS

The present disclosure is illustrated by way of example, and not by way of limitation, in the figures of the accompanying drawings.

DETAILED DESCRIPTION

Figure 1:
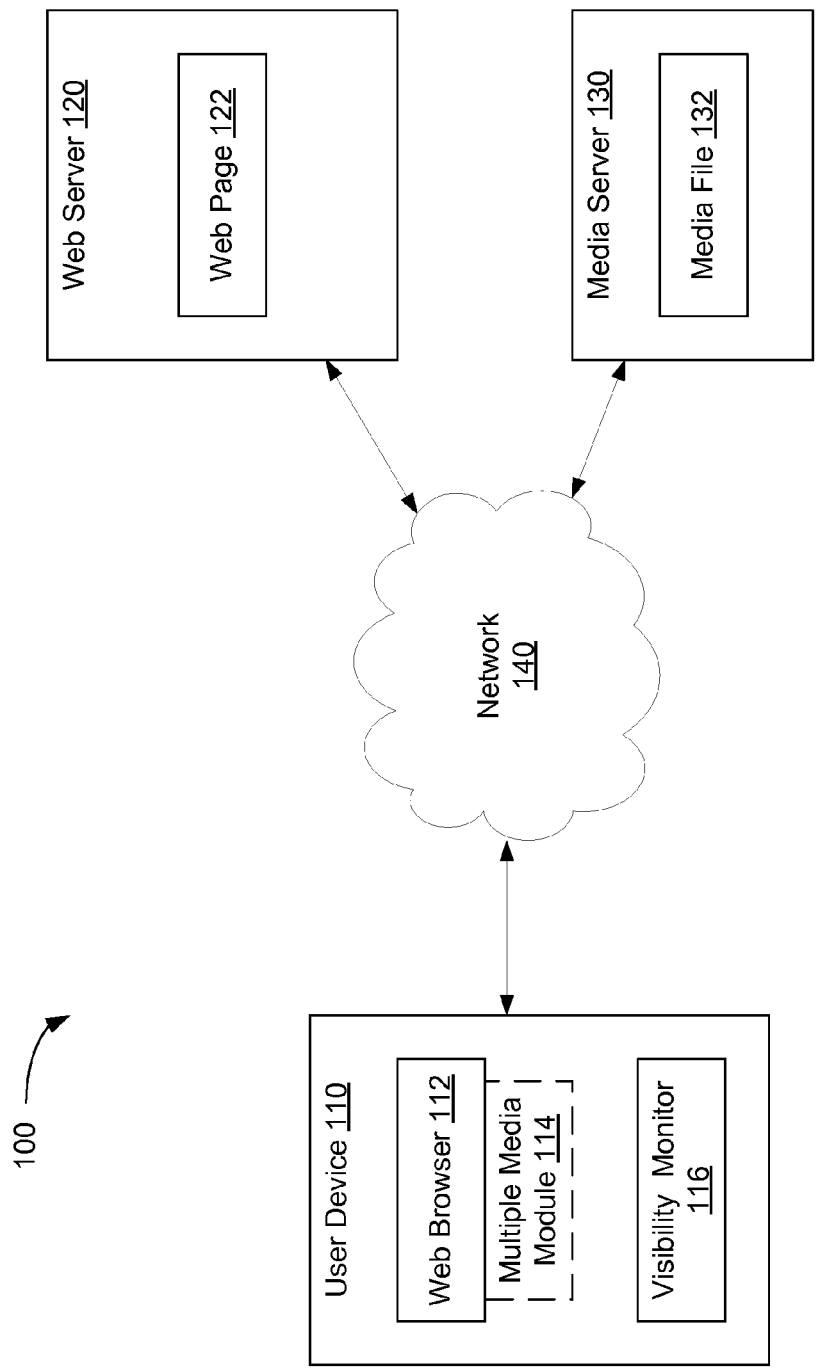
FIG. 1 is a block diagram illustrating an exemplary network architecture in which implementations of the present disclosure may be implemented.

Implementations are described for adjusting audio volume of multimedia when switching between multiple multimedia content. In one implementation, a user requests that multimedia content, including video and audio components, be streamed to a personal computer or other user device. For example, the user may play a music video using a media streaming website accessed through a browser running on the user's computer. In many cases, however, the user may access multiple streams of multimedia content simultaneously. For example, if the browser is a tabbed browser, the user may open a new tab and play another multimedia stream in the new tab. In this case, the first browser tab playing the initial media streaming website is minimized or shifted to the background and the new multimedia stream is active in the current tab.

In one implementation, a visibility monitor running on the user's computer detects that the first media player is no longer visible to the user due to the fact that the browser tab has been minimized or shifted to the background. For example, the browser may have an application programming interface (API), such as the Page Visibility API, which other devices can call to determine the visibility status of the tab containing the media player. While details are provided herein specifically relating to videos as an example for clarity of explanation, it shall be appreciated that such details may be equally applicable to other types of media, e.g., audio (e.g., music), flash-content, etc., as applicable.

If, for example, the web browser providing the multiple media players streaming the media content receives an indication from the visibility monitor that the user is not currently viewing the music video, the user device can dynamically adjust the volume level of the streaming audio component. In one implementation, the volume level can be muted. In another implementation, the streaming of the audio component can be halted completely. Muting the volume level or halting streaming of the audio component can reduce noise interference between simultaneously-playing videos, allowing them to be continuously running, but with a single audio feed tied to the currently-viewed media stream. If the web browser receives an indication from the visibility monitor that the tab containing the media player has been brought back to the foreground, the volume level of the media stream can be increased or streaming of the halted audio component resumed.

As a result of implementing the above, each video should automatically (without any user input) mute off when a user toggles away from it on the web browser and should automatically have the sound back on when the user toggles back to it. The user can successfully toggle back and forth between different videos and capture the sound only when it is relevant (i.e., when the user is actually watching that particular video), instead of having the various audio streams interfere with each other's sound. This allows the user to maintain an enjoyable experience while consuming the media content.

FIG. 1 is a block diagram illustrating an exemplary network architecture in which implementations of the present disclosure may be implemented. The network architecture 100 can include one or more user devices 110 communicating with one or more servers, such as web server 120 and media server 130 over one or more networks 140, according to one implementation. Network 140 can be a local area network (LAN), a wireless network, a telephone network, a mobile communications network, a wide area network (WAN), such as the Internet, or similar communication system. User device 110 may be any type of computing device including a server computer, gateway computer, desktop computer, laptop computer, mobile communications device, cell phone, smart phone, hand-held computer, tablet computer, or similar computing device. User device 110 may be variously configured with different features to enable viewing of multimedia content, such as images, videos, songs, etc.

Web server 120 and media server 130 may include a network-accessible server-based functionality, various data stores, and/or other data processing equipment. The servers 120 and 130 may be implemented by a single machine or a cluster of machines. As illustrated in FIG. 1, web server 120 and media server 130 are separate devices. In another implementation, however, web server 120 and media server 130 may be combined into a single machine or device. One or both of web server 120 and media server 130 may be hosted, for example, by computer system 700 of FIG. 7. In one implementation, web server 120 hosts web page 122. Web server 120 can deliver web page 122 to user device 110 or another client device using for example the Hypertext Transfer Protocol (HTTP). Web page 122 may be part of, for example, a media content hosting website that allows users to upload, view and share, multimedia content.

In one implementation, media server 130 includes one or more media files 132. Media file 132 may represent audio and video content that a user plays through web page 122. For example, when a user of user device 110 views web page 122, using a web browser or other content rendering program 112 running on user device 110, and requests to view a certain multimedia content, web server 120 can send a message to media server 130 requesting media file 132. Although the following description describes the use of a web browser 112, one skilled in the art will appreciate that other content rendering programs 112 may implement aspects of the disclosure. Media server 130 can initiate streaming of media file 132 to user device 110 via network 140. In one implementation, media file 132 is a music video file, including both a visual and an audio component. In other implementations, however, media file 132 may be some other type of media file, such as an MP3 audio file.

In some implementations, a user at user device 110 may request multiple media files 132 for simultaneous streaming to web browser 112. In this case, multiple media module 114, running in conjunction with web browser 112, can receive an indication from visibility monitor 116 of whether the user is currently viewing a tab or window playing streaming media. Based on the received indication, multiple media module 114 can dynamically adjust the audio of the streaming media that is not being currently viewed to be silent. A tab or a tabbed document interface (TDI) allows multiple documents (e.g., web pages) to be contained within a single window. By selecting different tabs, a user can switch between individual documents.

For example, if multiple media module 114 receives an indication that the user is not viewing one of the multiple streaming media at web browser 112 (e.g., because content of a tab or window of web browser 112 used to view the streaming media has been minimized or shifted to the background in favor of content in another tab or application), multiple media module 114 can optionally mute the audio portion of the media or pause the media item to silence the audio portion of the media. In some implementations, a video component of the media stream may continue to play and/or be transmitted to user device 110, so that the user may still receive a live feed of media uninterrupted. Some implementations of multiple media module 114 are discussed in more detail below.

Figure 2:
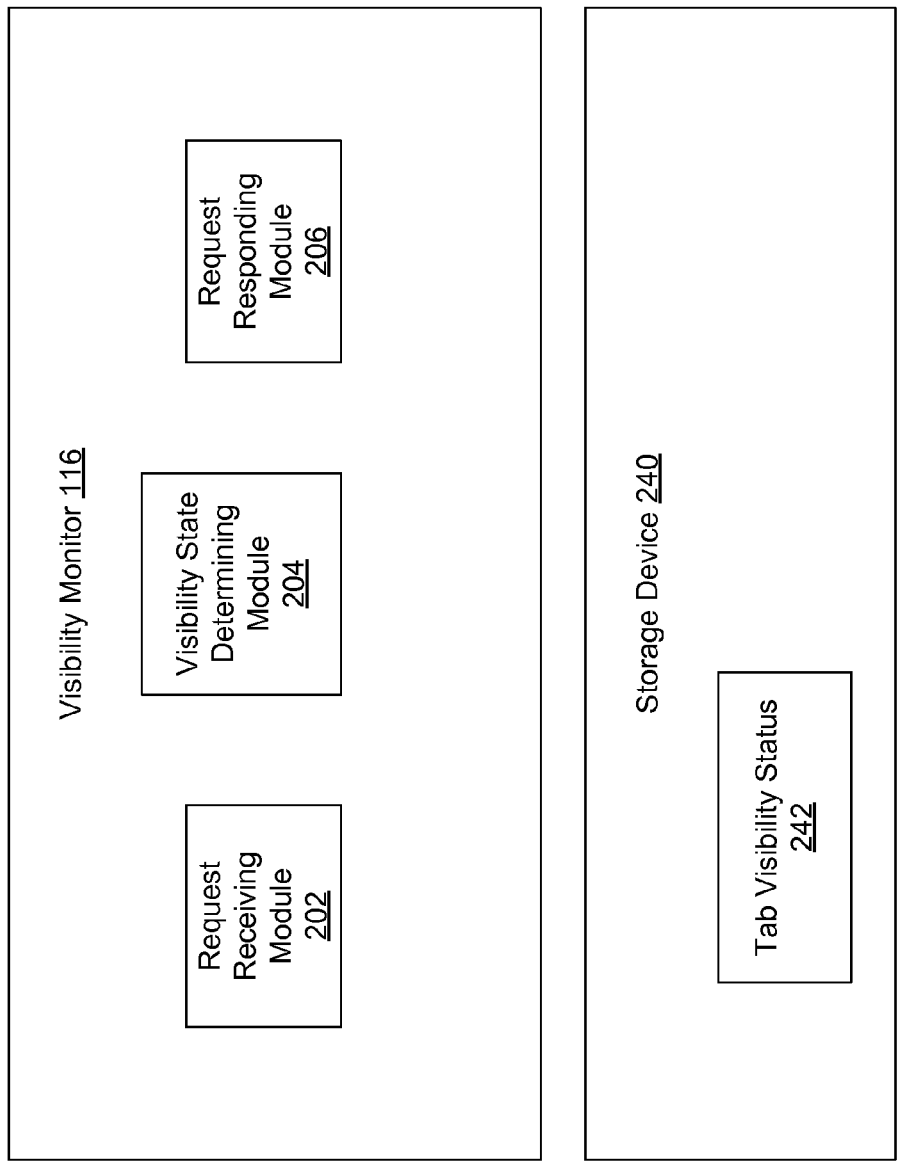
FIG. 2 is a block diagram illustrating a visibility monitor for detecting whether a user is currently viewing multimedia content, according to some implementations.

FIG. 2 is a block diagram illustrating a visibility monitor for detecting whether a user is currently viewing multimedia content, according to some implementations of the present disclosure. In one implementation, visibility monitor 114 includes request receiving module 202, visibility state determining module 204 and request responding module 206. This arrangement of modules may be a logical separation, and in other implementations, these modules or other components can be combined together or separated in further components, according to a particular implementation.

In one implementation, storage device 240 is connected to visibility monitor 116 and includes tab visibility status 242.

In one implementation, user device 110 may include visibility monitor 116 and storage device 240. In another implementation, storage device 240 may be external to user device 110 and may be connected to user device 110 over a network or other connection. In other implementations user device 110 may include different and/or additional components which are not shown to simplify the description. Storage device 240 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, request receiving module 202 receives requests, for example, from multiple media module 114, for the visibility status of a particular tab of web browser 112. The request may identify the tab of web browser 112 in which a media player is running and to which media server 130 is currently, was previously, or is about to stream media content, such as media file 132.

In one implementation, the request is in the form of an API call made, for example, to visibility monitor 116. In one implementation, visibility monitor 116 is the Page Visibility API. The Page Visibility API may be a standard interface that is included by a vendor of web browser 112. The Page Visibility API allows applications to request the visibility state of a document or web page (e.g., tab or window) being displayed by web browser 112. In other implementations, visibility monitor 116 may include some other API or specification. Upon receiving the request, request receiving module 202 may forward the request to, or otherwise notify, visibility state determining module 204 that the request has been received from media server 130. In other implementations, the request may be received from some other source besides multiple media module 114, such as from media server 130.

Figure 3A:
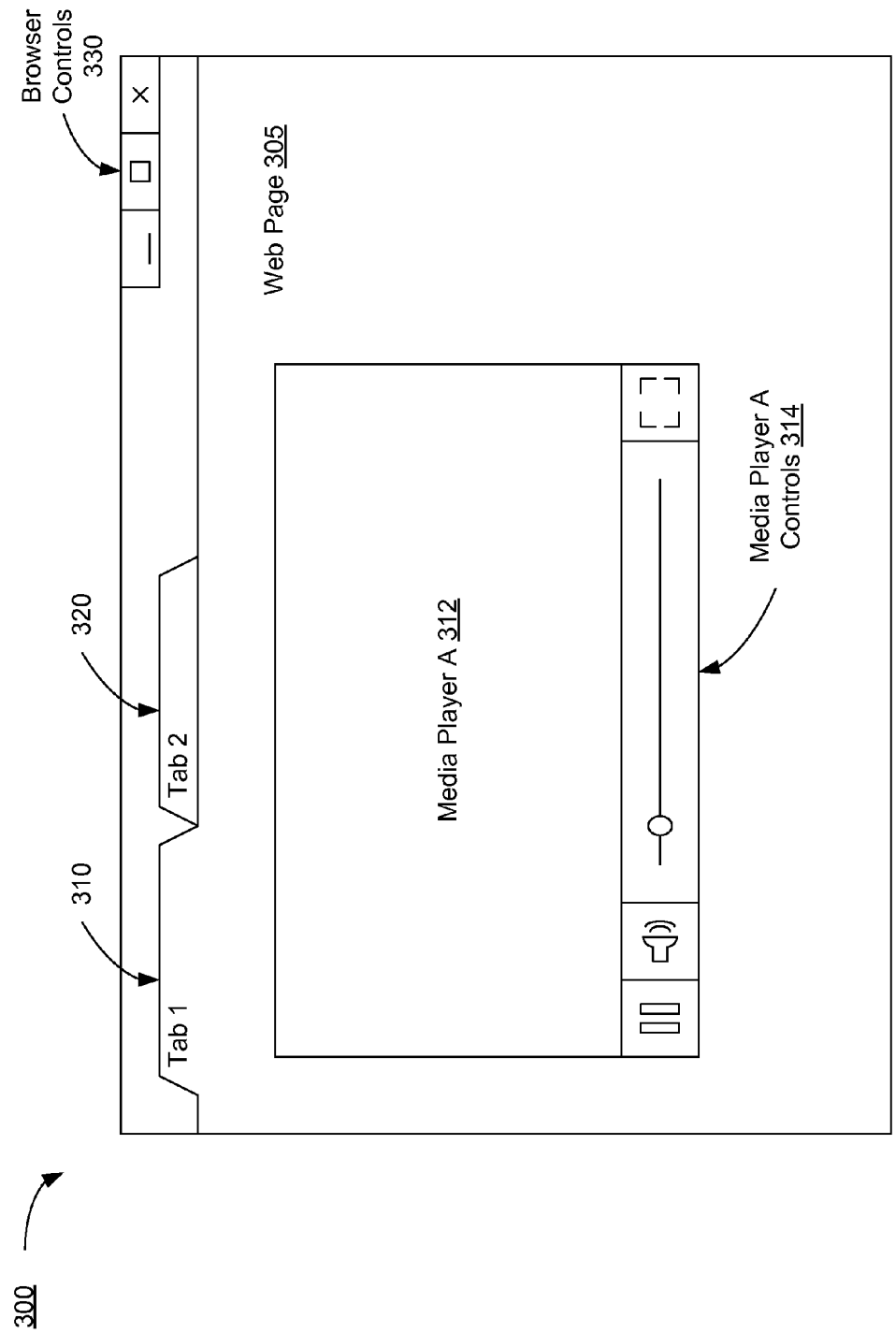
FIG. 3A is a diagram illustrating a graphical user interface (GUI) for viewing multimedia content, according to some implementations.

Visibility state determining module 204 can determine whether content of the requested tab or window of a content rendering application, such as web browser 112, is currently selected and/or active to a user. FIG. 3A illustrates an example GUI 300 for presenting media content, according to one implementation. In this implementation, the GUI 300 is a window of web browser or another content rendering application and includes one or more browsing tabs 310, 320 and browser controls 330. Browsing tabs 310 and 320 allow multiple web pages to be viewed in a single browser window. For example, browsing tab 310 may display web page 305 including media player A 312. In one implementation, media player A 312 may also include a set of controls 314 to control playback of media content.

When the first browsing tab 310 is selected or activated, web page 305 may be visible to the user, assuming no other windows are placed on top of the window for GUI 300. In one implementation, when a browsing tab is selected or activated, that means that the content associated with the browsing tab is visible. When a browsing tab is not selected or not active, that means that the content associated with the browsing tab is hidden. Any additional tabs, such as browsing tab 320 are in the background, and the content displayed therein is generally not visible to the user. Visibility state determining module 204 can determine if browsing tab 310 (i.e., the tab containing web page 305 and media player A 312) is currently selected, activated, or in the foreground of GUI 300. If so, visibility state determining module 204 can return a visible indicator and store that value in an entry in tab visibility status information 242 corresponding to tab 310. If another browsing tab 320 were activated, and browsing tab 310 was in the background, visibility state determining module 204 can return a hidden indicator. In some embodiments, the visibility state determining module 204 may utilize JAVA script commands, such as window.unblur and/or window.unfocus, to determine whether a particular tab or window is in an active state or not.

In one implementation, visibility state determining module 204 checks the status of tabs 310 and 320 in response to receiving the request. In other implementations, visibility state determining module 204 can check the status of tabs 310 and 320 at periodic intervals or can update the status in tab visibility status information 242 each time the status changes. In these implementations, rather than checking the status of each tab, visibility state determining module 204 can just read the stored values from tab visibility status information 242.

Figure 3B:
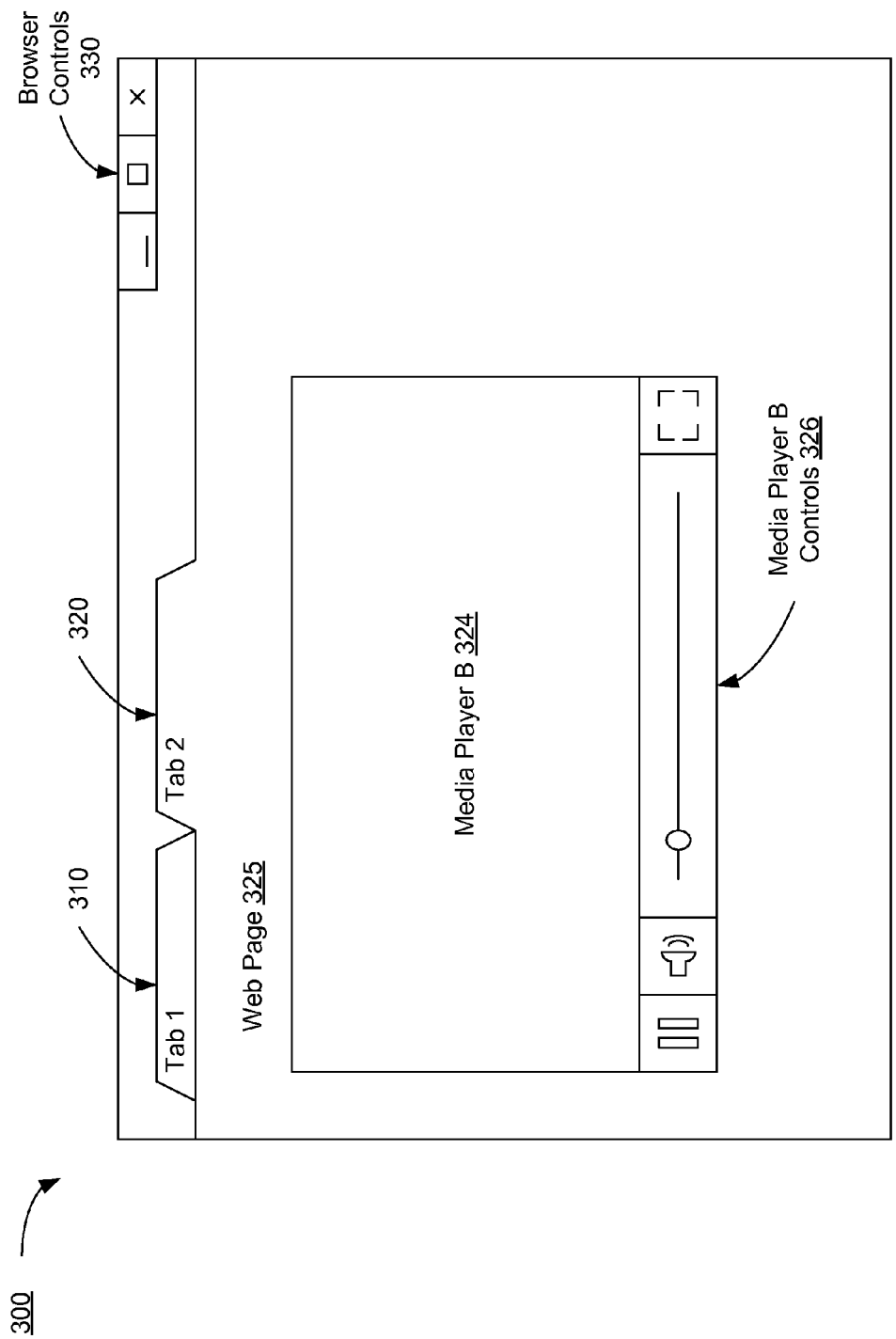
FIG. 3B is a diagram illustrating a GUI for viewing multimedia content, according to some implementations.

In one implementation, when the user requests to move browsing tab 310 to the background, the visibility status of browsing tab 310 can change. FIG. 3B illustrates an example GUI 300 for presenting media content, in this situation. In this implementation, a second browsing tab 320 is selected. The user may select tab 320 or switch between browsing tabs using, for example, browser controls 330, using a computer mouse or other pointer device, by tapping the selected tab if user device includes a touch sensitive display, or by some other means. In one implementation, browsing tab 320 displays a different web page 325, which may include a different media player B 324. In one implementation, media player B 324 may also include a set of controls 326 to control playback of media content from media player B 324. Media player A 312 remains running in browsing tab 310, which is now in the background. In one implementation, visibility state determining module 204 can update the status of browsing tabs 310 and 320 in tab visibility status information 242.

In one implementation, request responding module 206 can respond to the request for the visibility status of a particular tab. Request responding module 206 can read the current value stored in tab visibility status information 242 for the particular tab and send a response, including the value, to the requestor. In one implementation request responding module 260 sends the response to multiple media module 114. Request responding module 206 can send an update with the state information of each tab to multiple media module 114 in response to the request, periodically, or each time the status of a tab is updated in tab visibility status information 242. In another implementation, where the requestor is media server 130, request responding module 206 can send the response over network 140.

Figure 4:
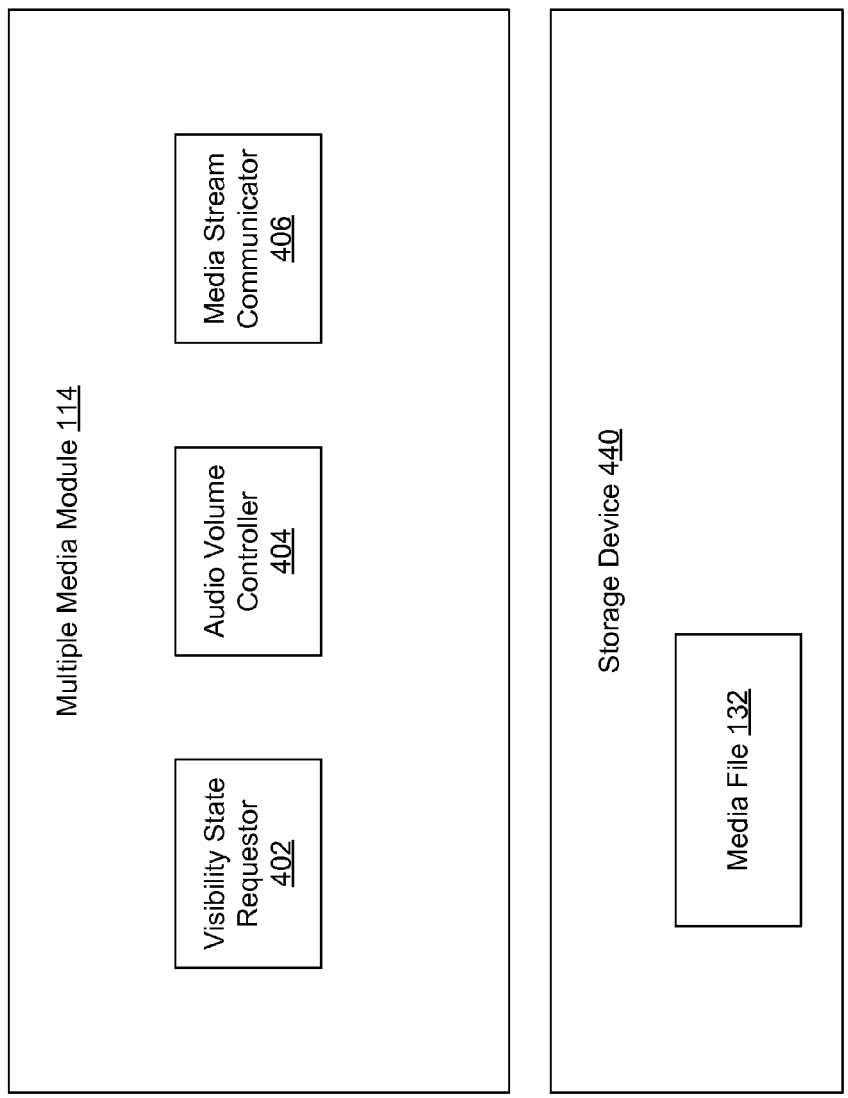
FIG. 4 is a block diagram illustrating a multiple media module for dynamically adjusting audio volume level, according to some implementations.

FIG. 4 is a block diagram illustrating a multiple media module for dynamically adjusting audio volume, according to some implementations. In one implementation, multiple media module 134 includes visibility state requestor 402, audio volume controller 404, and media stream communicator 406. This arrangement of modules may be a logical separation, and in other implementations, these modules or other components can be combined together or separated in further components, according to a particular implementation. In one implementation, multiple media module 114 is a plug-in component or browser extension of web browser 112.

In one implementation, storage device 440 is connected to multiple media module 114 and includes media file 132. In one implementation, user device 110 may include multiple media module 114 and storage device 440. In another implementation, storage device 440 may be external to user device 110 and may be connected to user device 110 over a network or other connection. In other implementations, user device 110 may include different and/or additional components which are not shown to simplify the description. Storage device 440 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, visibility state requestor 402 generates and issues a request to visibility monitor 116 for the visibility status of a tab of web browser 112 in which multiple media players, such as media player A 312 and media player B 324, are running. The request may specify the particular browsing tab 310, 312 or may be for the status of all tabs and/or windows of web browser 112. In one implementation, visibility state requestor 402 may repeatedly issue a request at periodic intervals. In another implementation, visibility state requestor 402 may issue the request in response to a command from an administrator or other entity. In response to the request, visibility state requestor 402 can receive a value indicating the visibility status (e.g., "visible" or "hidden") from visibility monitor 116 on user device 110.

In one implementation, audio volume controller 404 can dynamically adjust the volume level of the audio component of media file 132 and/or halt playback of the media file completely. If visibility state requestor 402 receives an indication from the visibility monitor 116 that a browsing tab/window containing one of multiple media players running in the web browser 112 is not visible or active to the user, audio volume controller 404 may reduce or mute the volume level of the audio component of the media file 132 playing on the inactive browsing tab/window.

For example, audio volume controller 504 may mute the volume level of the audio component of media file 132 that is streamed to user device 110 by instructing the media player on the inactive tab to turn off the audio portion of the particular media stream. In another implementation, media stream communicator 406 may halt playback (e.g., pause or stop playback) of the audio component of the media file or of the entire media file (audio and video components) completely. In one implementation, media server 130 may be streaming media file 132 to user device 110. In this case, the multiple media stream communicator 406 may work in conjunction with media server 130 to halt transmission of media file, or the audio portion of media file.

In some implementations, when the audio component being halted or muted, the video component of the streaming media may remain unchanged, so that the user can continue to receive live feed of corresponding streaming video. Similarly, if visibility state requestor 402 receives an indication that the browsing tab or window has become visible again, audio volume controller 404 can resume the audio output of the audio component of media file 132 back to an original or default setting, or media stream communicator 406 can resume transmission of the audio component. In one implementation, the default setting of audio volume is configured by an administrator of the user deice or may be configured by the user of user device.

Figure 5:
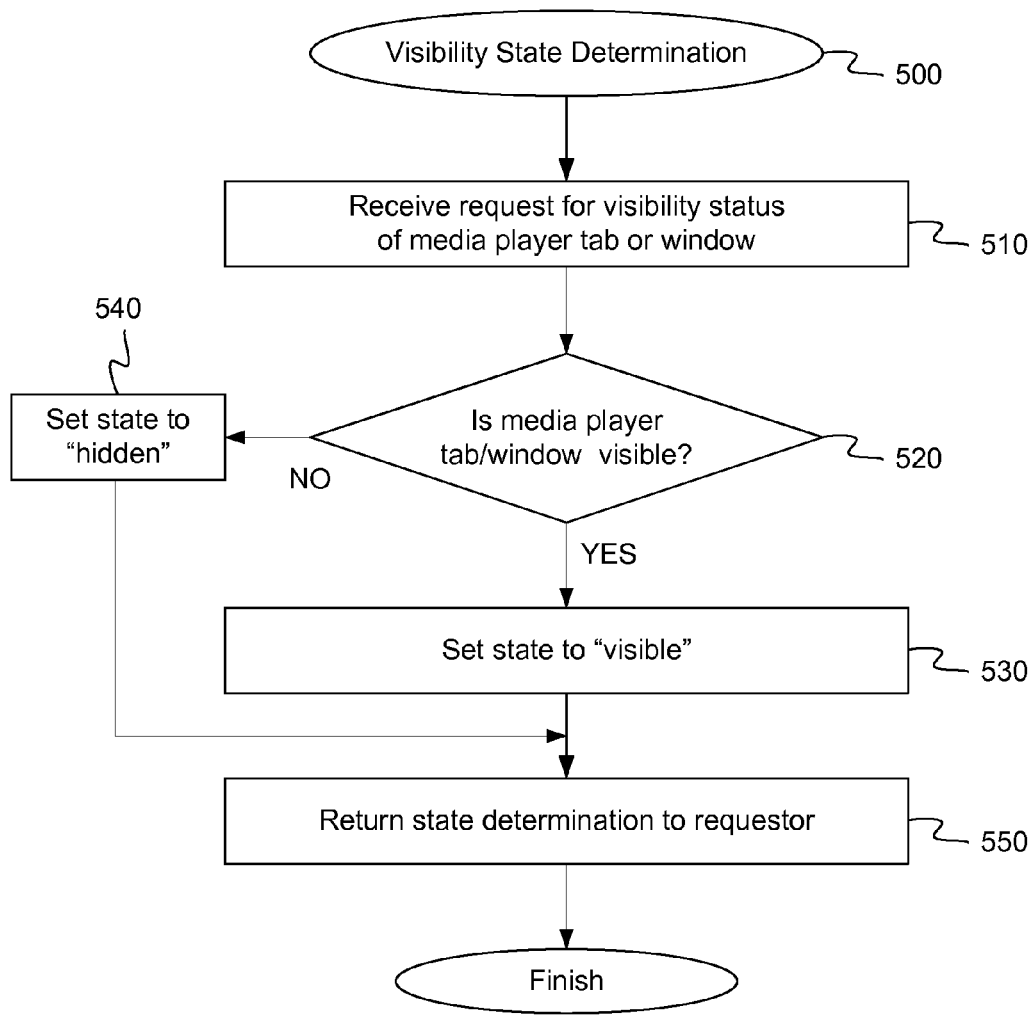
FIG. 5 is a flow diagram illustrating a method for the visibility state of a tab in a GUI, according to some implementations.

FIG. 5 is a flow diagram illustrating a method for the visibility state of a tab and/or window in a web browser, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 500 can determine whether a browsing tab containing a media player that is streaming media content that is visible to a user of the computing device running the browser.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by visibility monitor 116, as shown in FIGS. 1 and 2.

Referring to FIG. 5, at block 510, method 500 receives a request for visibility status of media player content, such as content associated with a browsing tab or a browsing window. For convenience of the following discussion, browsing tabs are referred to. However, one skilled in the art will appreciate that embodiments of the implementation are equally applicable to multiple browsing windows. In one implementation, request receiving module receives the request, for example, from a multiple media module of a web browser. The request may identify the tab or window of web browser having a media player that is playing streamed media content, such as media file.

In one implementation, the request is in the form of an API call made, for example, to visibility monitor. In one implementation, visibility monitor is the Page Visibility API. Upon receiving the request, request receiving module may forward the request to, or otherwise notify, visibility state determining module that the request has been received from multiple media module. In other implementations, the request may be received from some other source, such as a media server.

At block 520, method 500 determines if the content associated with the media player tab is visible to the user. Visibility state determining module can determine whether the content of the requested tab is currently visible to the user. The content of the tab may be visible to the user when the tab is selected, activated, or running in the foreground of web browser. Any additional tabs, such as browsing tabs or additional browsing windows, are in the background, and the content displayed therein is generally not visible to the user. Visibility state determining module can determine whether each browsing tab is activated or not, and if activated, determine that the content of the browsing tab is visible. If at block 520, method 500 determines that the content of the browsing tab is visible, at block 530, method 500 sets the state value for browsing tab to "visible."

If at block 520, method 500 determines that the browsing tab is not visible, at block 540, method 500 sets the state value for browsing tab to "hidden." In one implementation, visibility state determining module can store the value in tab visibility status information. Alternatively, the steps at blocks 520 and 530 are not performed in response to block 510. In one implementation, the visibility status is updated by a different process (e.g., every time a different tab is selected) and method 500 will only need to access this information, rather than sending a specific request.

At block 550, method 500 returns the determined state value to the requestor. In one implementation, request responding module can respond to the request for the visibility status of a particular tab. Request responding module can read the current value stored in tab visibility status information for the particular tab and send a response, including the value, to the requestor. In one implementation where the requestor is media server, request responding module can send the response over network.

Figure 6:
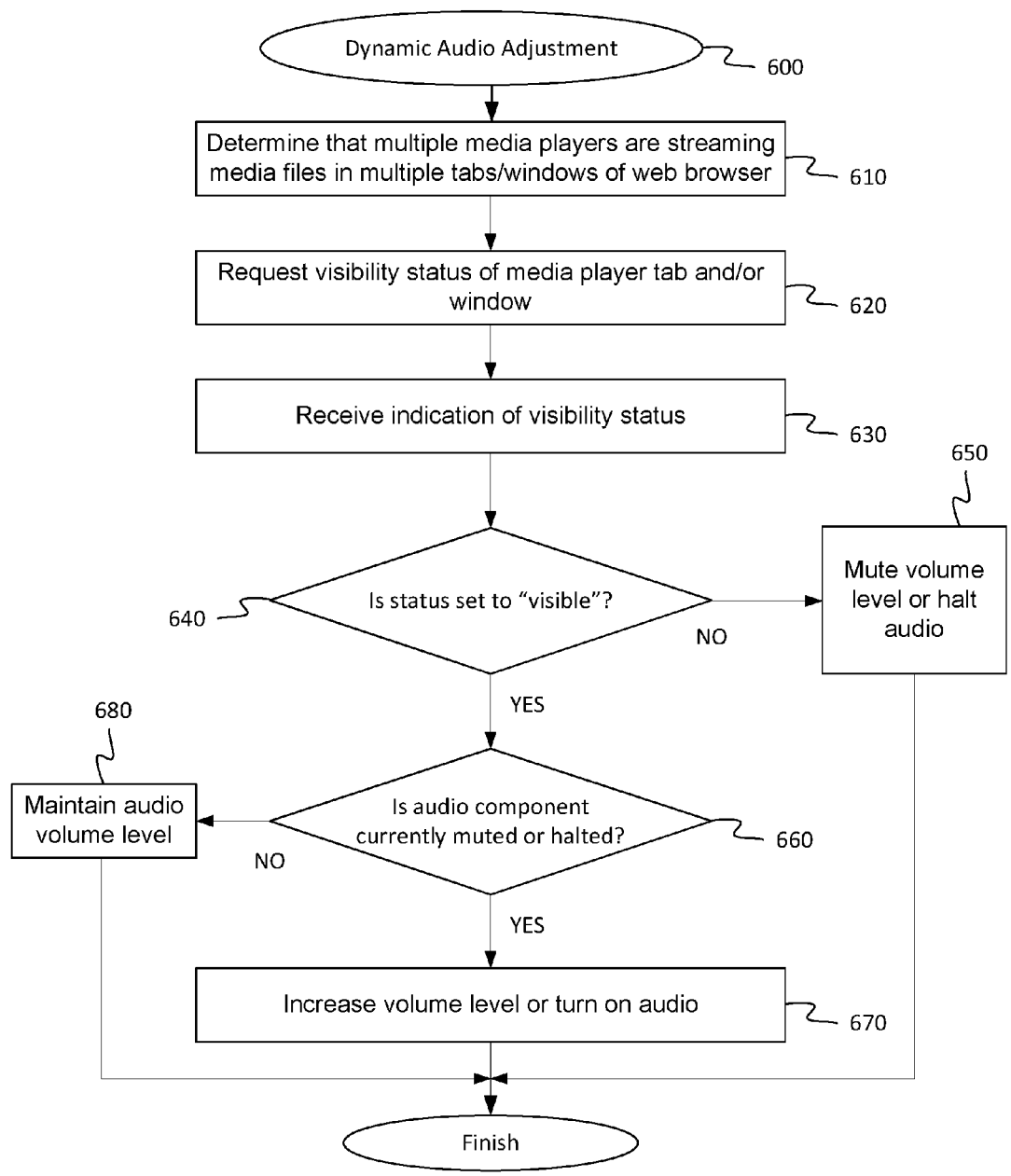
FIG. 6 is a flow diagram illustrating a method for dynamically adjusting audio volume level, according to some implementations.

FIG. 6 is a flow diagram illustrating a method for dynamically adjusting audio output, according to an implementation of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can dynamically adjust audio output based on whether the streaming video is visible to a user. In one implementation, method 600 may be performed by multiple media module 114 as shown in FIG. 1 and FIG. 4.

Referring to FIG. 6, at block 610, method 600 determines that multiple media players are streaming media files in multiple browsing tabs and/or browsing windows. For convenience of the following discussion, browsing tabs are referred to. However, one skilled in the art will appreciate that embodiments of the implementation are equally applicable to multiple browsing windows. In response to the determination of multiple media players in multiple browsing tabs, method 600, at block 620, requests the visibility status of a browsing tab containing media player. In one implementation, visibility state requestor generates and issues a request to user device for the visibility status of the browsing tab. In one implementation, visibility state requestor may repeatedly issue a request at periodic intervals. In another implementation, visibility state requestor may issue the request in response to a command from an administrator or other entity.

In response to the request, at block 630, method 600 receives an indication of the requested visibility state. Visibility state requestor can receive a value indicating the visibility status (e.g., "visible" or "hidden") from visibility monitor on user device. Alternatively, user device can provide an update to the visibility status each time the status changes during media streaming.

At block 640, method 600 determines if the received visibility status is set to "visible" or if the received indication otherwise indicates that the content of the browsing tab is active. In one implementation, the visibility status will be set to either "visible" or "hidden." In other implementations, however, some other indication may be provided. If at block 640, method 600 determines that the visibility status is not set to "visible," at block 650, method 600 mutes the volume of the audio or halts playback of the audio component. For example, audio output controller may mute the volume level of the audio component of media file that is streamed to user device. In another implementation, media stream communicator may halt playback (e.g., pause or stop media) of the audio component completely. In some embodiments, media stream communicator may work in conjunction with a media server to cause transmission of the audio component to be halted.

If at block 640, method 600 determines that the visibility status is set to "visible," at block 660, method 600 determines if the audio component of media file is currently muted or halted. If so, then at block 670, method 600 increases the volume level back to a default setting or resumes playback of the audio component. In one implementation, the audio component of media file may have a default volume setting. This may be for example, the average volume level supported by user device or some intermediate volume level. In one implementation, the default volume level may be set by the user of user device. Audio volume controller may track what quality setting is currently being used to stream the video component to user device. If at block 660, method 600 determines that the audio component is not currently muted or halted, then, at block 680, method 600 maintains the current volume level of the audio component.

Figure 7:
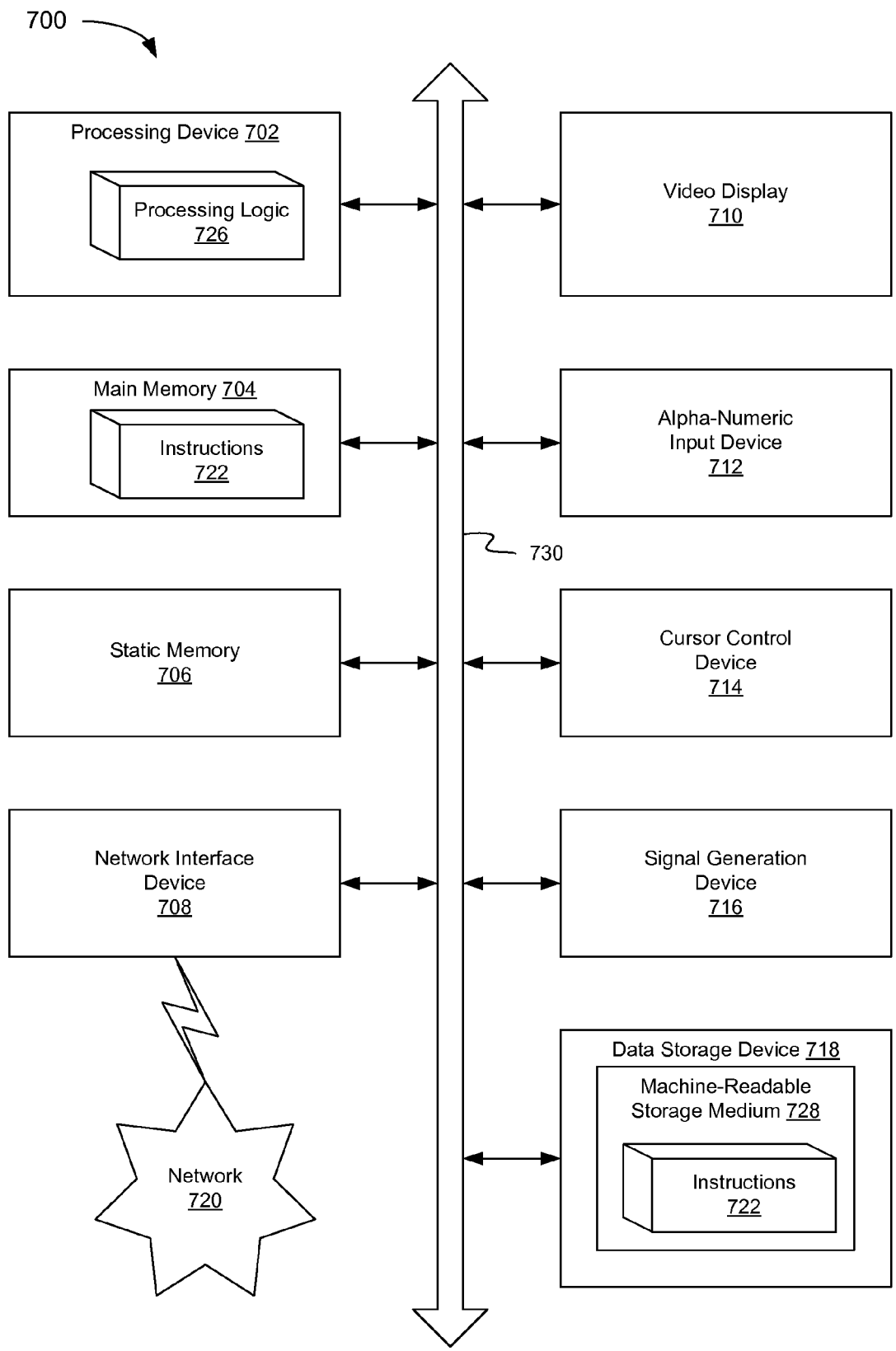
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 700 may be representative of a user device, such as user device 110 running a web browser with a multiple media module 114.

The exemplary computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728, on which is stored one or more set of instructions 722 (e.g., software) embodying any one or more of the methodologies of functions described herein. The instructions 722 may also reside, completely or at least partially, within the main memory 704 and/or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for dynamically adjusting video quality, as described herein. While the machine-readable storage medium 728 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present invention. It will be apparent to one skilled in the art, however, that at least some implementations of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    sending, by a processing device of a media server, a request for a visibility status of a particular tab containing a streaming media player of a plurality of tabs presented on a web browser graphical user interface (GUI), wherein the request for a visibility status of the particular tab is sent by using via a page visibility application programming interface (API) of the web browser (GUI), wherein the web browser (GUI) is presented on a user device that is separate from the media server;
    determining, by the processing device of the media server, based on the requested visibility status of the particular tab, whether the visibility status of the particular tab is set to a visible state or a hidden state, wherein the visibility status of the particular tab is set to the visible state when the particular tab is selected at the user device to make the particular tab active, and wherein the visibility status of the particular tab is set to the hidden state when the particular tab is not active and in the background of the web browser GUI behind one or more of the plurality of tabs presented on the web browser GUI;
    responsive to the determination that the visibility status of the particular tab is set to the visible state:
    determining whether an audio component volume level associated with the particular tab containing the streaming media player is in a muted state;
    responsive to the determination that the audio component volume level associated with the particular tab containing the media player is in the muted state, increasing the audio component volume level associated with the particular tab containing the streaming media player to a default setting for the audio component volume level; and
    responsive to the determination that the audio component volume level associated with the particular tab containing the streaming media player is not in the muted state, maintaining a current setting of the audio component volume level associated with the particular tab containing the streaming media player; and
    responsive to the determination that the visibility status of the particular tab is set to the hidden state:
    causing, by the processing device, transmission of the audio component of the particular tab containing the streaming media player to halt in order to mute the audio component volume level of a streaming media file at the user device.

2. The method of claim 1, further comprising:
    continuing to transmit a video component of the streaming media file to the user device.

3. The method of claim 1, wherein increasing the volume level comprises resuming transmission of the audio component.

4. The method of claim 1, wherein sending the request for the status of the tab is performed at periodic time intervals.

5. A non-transitory machine-readable storage medium storing instructions which, when executed by a processing device, cause a data processing system to perform operations comprising:
    sending, by a processing device of a media server, a request for a visibility status of a particular tab containing a streaming media player of a plurality of tabs presented on a web browser graphical user interface (GUI), wherein the request for a visibility status of the particular tab is sent by using via a page visibility application programming interface (API) of the web browser (GUI), corresponding to a graphical user interface (GUI) wherein the web browser (GUI) is presented on a user device that is separate from the media server;

determining, by the processing device of the media server, based on the requested visibility status of the particular tab, whether the visibility status of the particular tab is set to a visible state or a hidden state, wherein the visibility status of the particular tab is set to the visible state when the particular tab is selected at the user device to make the particular tab active, and wherein the visibility status of the particular tab is set to the hidden state when the particular tab is not active and in the background of the web browser GUI behind one or more of the plurality of tabs presented on the web browser GUI;

responsive to the determination that the visibility status of the particular tab is set to the visible state:

determining whether an audio component volume level associated with the particular tab containing the streaming media player is in a muted state;

responsive to the determination that the audio component volume level associated with the particular tab containing the media player is in the muted state, increasing the audio component volume level associated with the particular tab containing the streaming media player to a default setting for the audio component volume level; and responsive to the determination that the audio component volume level associated with the particular tab containing the streaming media player is not in the muted state, maintaining a current setting of the audio component volume level associated with the particular tab containing the streaming media player; and responsive to the determination that the visibility status of the particular tab is set to the hidden state:

causing, by the processing device, transmission of the audio component of the particular tab containing the streaming media player to halt in order to mute the audio component volume level of a streaming media file at the user device.

6. The non-transitory machine-readable storage medium of claim 5, the operations further comprising:

continuing to transmit a video component of the streaming media file to the user device.

7. The non-transitory machine-readable storage medium of claim 5, wherein increasing the volume level comprises resuming transmission of the audio component.

8. The non-transitory machine-readable storage medium of claim 5, wherein sending the request for the status of the tab is performed at periodic time intervals.

9. A system comprising:

a processing device;

a memory coupled to the processing device; and a multiple media module executable by the processing device from the memory, the multiple media module part of a media server and configured to:

send, by a processing device of a media server, a request for a visibility status of a particular tab containing a streaming media player of a plurality of tabs presented on a web browser graphical user interface (GUI), wherein the request for a visibility status of the particular tab is sent by using a page visibility application programming interface (API) of the web browser (GUI), wherein the web browser (GUI) is presented on a user device that is separate from the media server;

determine, by the processing device of the media server, based on the requested visibility status of the particular tab, whether the visibility status of the particular tab is set to a visible state or a hidden state, wherein the visibility status of the particular tab is set to the visible state when the particular tab is selected at the user device to make the particular tab active, and wherein the visibility status of the particular tab is set to the hidden state when the particular tab is not active and in the background of the web browser GUI behind one or more of the plurality of tabs presented on the web browser GUI;

responsive to the determination that the visibility status of the particular tab is set to the visible state:

determine whether an audio component volume level associated with the particular tab containing the streaming media player is in a muted state;

responsive to the determination that the audio component volume level associated with the particular tab containing the media player is in the muted state, increase the audio component volume level associated with the particular tab containing the streaming media player to a default setting for the audio component volume level; and responsive to the determination that the audio component volume level associated with the particular tab containing the streaming media player is not in the muted state, maintain a current setting of the audio component volume level associated with the particular tab containing the streaming media player; and responsive to the determination that the visibility status of the particular tab is set to the hidden state:

cause, by the processing device, transmission of the audio component of the particular tab containing the streaming media player to halt in order to mute the audio component volume level of a streaming media file at the user device.

10. The system of claim 9, the multiple media module further configured to:

continue to transmit a video component of the streaming media file to the user device.

11. The system of claim 9, wherein increasing the volume level comprises resuming transmission of the audio component.

12. The system of claim 9, wherein the multiple media module to send the request for the status of the tab at periodic time intervals.

* * * * *